United States Patent
Narushima

(10) Patent No.: US 7,983,618 B2
(45) Date of Patent: Jul. 19, 2011

(54) ELECTRONIC APPLIANCE, COMMUNICATION CONDITION SETTING DEVICE, COMMUNICATION CONDITION SETTING METHOD AND COMPUTER PROGRAM

(75) Inventor: Toshio Narushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 12/033,588

(22) Filed: Feb. 19, 2008

(65) Prior Publication Data

US 2008/0197918 A1 Aug. 21, 2008

(30) Foreign Application Priority Data

Feb. 21, 2007 (JP) ................................ 2007-040253

(51) Int. Cl.
*H04B 1/00* (2006.01)
*H04B 15/00* (2006.01)

(52) U.S. Cl. ................. 455/63.1; 455/452.1; 455/452.2; 455/454; 455/456.1; 455/456.4; 455/67.11; 455/67.13; 455/114.2; 455/296; 375/346

(58) Field of Classification Search .... 455/452.1–452.2, 455/454, 456.1, 456.4, 63.1, 67.11, 67.13, 455/114.2, 296; 375/346

See application file for complete search history.

(56) References Cited

U.S. PATENT DOCUMENTS

| | | | | |
|---|---|---|---|---|
| 5,825,331 | A * | 10/1998 | Lee | 343/703 |
| 6,313,786 | B1 * | 11/2001 | Sheynblat et al. | 342/357.23 |
| 6,509,742 | B1 * | 1/2003 | Ebizuka et al. | 324/627 |
| 7,006,553 | B1 * | 2/2006 | McCorkle | 375/130 |
| 7,280,607 | B2 * | 10/2007 | McCorkle et al. | 375/295 |
| 7,315,564 | B2 * | 1/2008 | McCorkle | 375/130 |
| 7,437,166 | B2 * | 10/2008 | Osseiran et al. | 455/452.1 |
| 2003/0058973 | A1 * | 3/2003 | Tsecouras | 375/344 |
| 2006/0183426 | A1 * | 8/2006 | Graves et al. | 455/63.1 |

FOREIGN PATENT DOCUMENTS

JP 11-206107 7/1999

* cited by examiner

*Primary Examiner* — Tuan A Tran
(74) *Attorney, Agent, or Firm* — SNR Denton US LLP

(57) ABSTRACT

An electronic appliance having a communication function conforming to a wide band wireless communication system is disclosed. The electronic appliance includes: an EMI pattern information storage part configured to store EMI (electromagnetic interference) pattern information unique to the electronic appliance itself or EMI pattern information unique to an electronic appliance of the same type; an EMI standard value information acquiring part configured to acquire EMI standard value information valid in a relevant nation or region based on location information of the electronic appliance itself; and a communication condition setting part configured to set a communication condition relating to a wide band wireless communication based on the result of comparison between the acquired EMI standard value information and the EMI pattern information.

17 Claims, 12 Drawing Sheets

ELECTRONIC APPLIANCE, COMMUNICATION CONDITION SETTING DEVICE, COMMUNICATION CONDITION SETTING METHOD AND COMPUTER PROGRAM

CROSS REFERENCES TO RELATED APPLICATIONS

The present invention contains subject matter related to Japanese Patent Application JP 2007-040253 filed in the Japanese Patent Office on Feb. 21, 2007, the entire contents of which being incorporated herein by reference.

BACKGROUND OF THE INVENTION

1. Field of the Invention

The present invention relates to a technique that optimizes the communication condition of a wide band wireless communication system with which an electronic appliance is in compliance depending on the communication condition of the country or region where the electronic appliance is used.

In addition, the invention includes an electronic appliance, a communication condition setting device, a communication condition setting method and a computer program.

2. Description of the Related Art

In recent years, in the field of wireless communications, an UWB (Ultra Wideband) wireless communication system is becoming widely available as one of prominent communication systems. The UWB wireless communication system has been developed for military purposes in the United States in the first place, and then opened to private sectors.

In the other wireless communication systems, the frequency bandwidth of a single channel is about several tens of MHz, whereas in the UWB wireless communication system, a frequency bandwidth of 3.1 GHz to 10.6 GHz is used. On this account, in the UWB wireless communication system, a large capacity of data can be transmitted at high speed.

The UWB wireless communication system has the characteristics that the radiation power level in frequency bands is very low and no interference occurs with other systems. In addition, the UWB wireless communication system also has the characteristics that power consumption is small.

With these characteristics, the UWB wireless communication system is used for a sensor using a position determination function, a radar using an object sensing function, and wireless communications between electronic appliances, for example.

In recent years, the influence of electromagnetic waves emitted from an electronic appliance upon other appliances is perceived as a problem.

This influence is referred to as electromagnetic interference (EMI), and mainly two types of transmission forms are considered. One of them is radiation interference waves (extraneous emissions) that are directly emitted from an electronic appliance to space, and the other is conducted interference waves that conduct through an AC (alternating current) power source line. Particularly, it is considered to be more important to take measures against the radiation interference waves emitted from various circuits configuring an electronic appliance at the same time.

Today, efforts for the EMI standard are conducted across the world. For example, in many countries, the rules compliant to the standards of the Comite International Special des Perturbations (CISPR) that is an international organization, and the import and sales of electronic appliances violating the limit values are banned.

For example, in Japan, there is the VCCI (Voluntary Control Council for Information Technology Equipment) standard developed by a voluntary restraint group. In addition, for example, in the United States, there is the FCC (Federal Communications Commission) standard. Moreover, for example, in Europe, there is EN (European Norm) standard.

These limit values (in other words, EMI standard values) are decided as the circumstances of radio waves in the individual countries and regions are reflected. Therefore, the EMI standard values are varied depending on the countries and regions, and it is often necessary to change the settings of an electronic appliance in order to follow the EMI standard values.

However, in association with the provision of high performance and complex mechanisms for electronic appliances nowadays, another problem arises. In other words, in the consequence of the provision of high performance and complex mechanisms for electronic appliances, such a problem arises that even the same electronic appliances have different levels of extraneous emission depending on the differences in the operation details and circuit systems of the electronic appliances. As the result, even though an EMI filter is used, it is difficult to reliably remove radiation interference waves.

Then, JP-A-11-206107 (Patent Reference 1) discloses a technique in which connections between a power source and a ground are controlled separately depending on circuit systems in order to meet the EMI standard of the countries that provide the levels of extraneous emission of electronic appliances.

SUMMARY OF THE INVENTION

However, in the case in which an electronic appliance conforms to the UWB wireless communication system, the waveform of the EMI pattern unique to the appliance and the pattern of the waveform of UWB radiation are added together at a frequency band where the phases of the patterns match with each other.

On this account, even though the EMI pattern unique to the appliance can be controlled to fall below the EMI standard values in the country by the technique described in the Patent Reference 1, for example, there may occur such an event that the EMI standard values are unpredictably exceeded in the case in which the patterns are added.

According to an embodiment of the invention, there is provided an electronic appliance having a communication function conforming to a wide band wireless communication system, and including: (a) an EMI pattern information storage part configured to store EMI (electromagnetic interference) pattern information unique to the electronic appliance itself or EMI pattern information unique to an electronic appliance of the same type; (b) an EMI standard value information acquiring part configured to acquire EMI standard value information valid in a relevant nation or region based on location information of the electronic appliance itself; and (c) a communication condition setting part configured to set a communication condition relating to a wide band wireless communication based on the result of comparison between the acquired EMI standard value information and the EMI pattern information.

Moreover, preferably, the EMI standard value information acquiring part is provided with a function by which, when EMI standard value information or information identifying EMI standard value information is acquired, the acquired or identified EMI standard value information is sent to another electronic appliance connected through wireless connection to one or a plurality of networks with which the electronic appliance itself can communicate. In this case, a premise is the existence of an electronic appliance provided with a function that can receive the EMI standard value information or the information identifying EMI standard value information from another electronic appliance over the network.

In addition, preferably, the electronic appliance that receives EMI standard value information or the information identifying EMI standard value information from the another electronic appliance includes: (a) an EMI pattern information storage part configured to store EMI (electromagnetic interference) pattern information unique to the electronic appliance itself or EMI pattern information unique to an electronic appliance of the same type; and (b) a communication condition setting part configured to set a communication condition relating to a wide band wireless communication based on the result of comparison between the acquired or identified EMI standard value information and the EMI pattern information.

Moreover, preferably, the electronic appliance that receives the EMI standard value information or the information identifying EMI standard value information from the another electronic appliance is provided with a function by which, when there is at least one network to which the electronic appliance itself is connected through wireless connection other than the network from which the EMI standard value information or the information identifying EMI standard value information is acquired, the EMI standard value information or the information identifying EMI standard value information is transferred to the at least one network.

According to the embodiments of the invention, an event that the EMI standard values are unpredictably exceeded in wide band wireless communications can be reliably avoided.

DETAILED DESCRIPTION OF THE INVENTION

Herein after, an electronic appliance according to an embodiment of the invention will be described.

In addition, to the sections neither depicted nor described particularly in the specification, well known or publicly known techniques in the relevant technical field are adapted.

Moreover, embodiments described below are one of embodiments according to an embodiment of the invention, which will not restrict the invention.

Examples of EMI Standard Values

Figure 1:
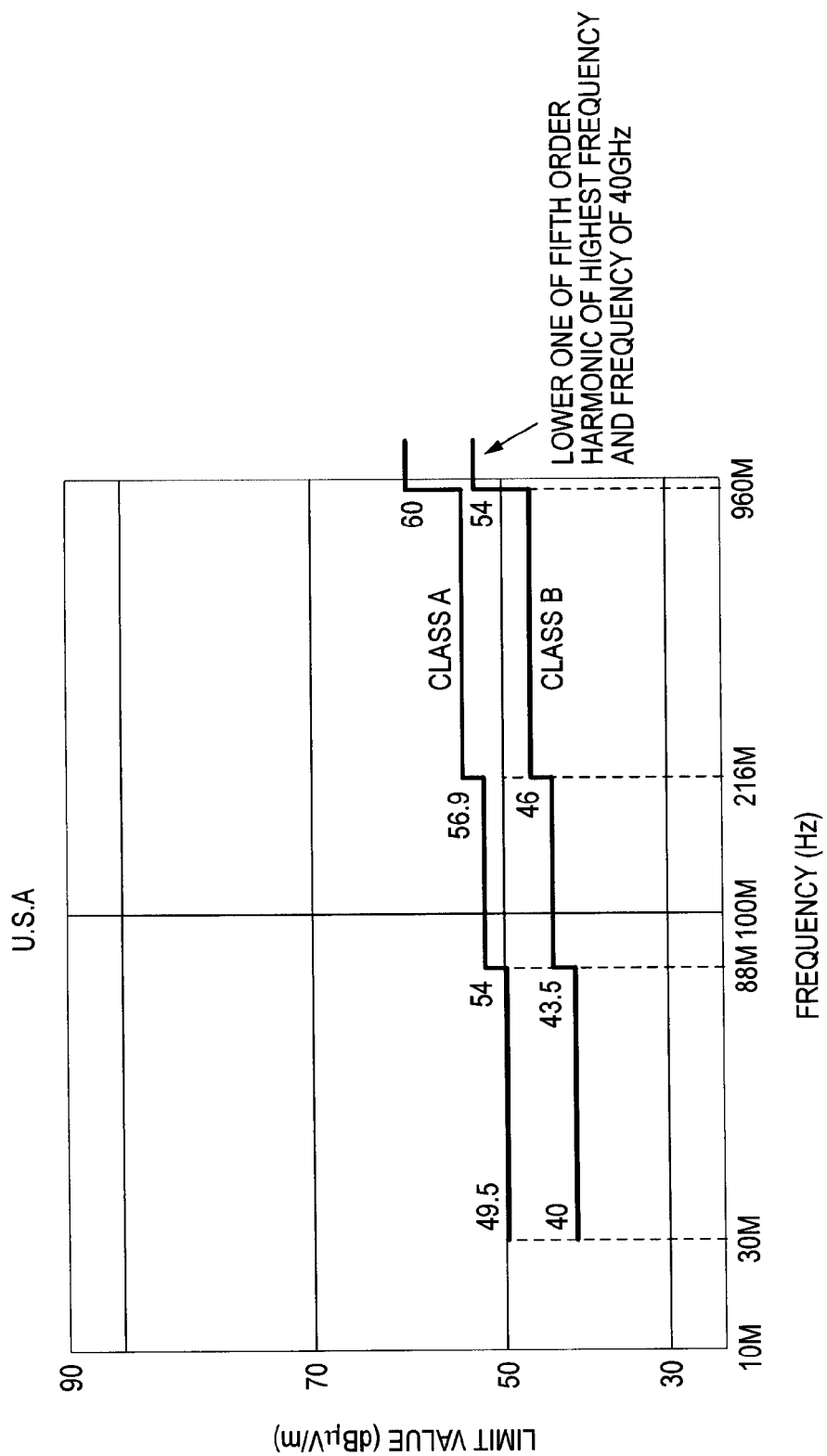
FIG. 1 shows a diagram depicting exemplary EMI standard values based on the FCC standard.

FIG. 1 shows the EMI standard values in an industrial or a commercial area (Class A) and a residential area (Class B) based on the FCC standard in the United States. In the case of the FCC standard, frequency ranges of 30 MHz to 40 GHz are defined.

Figure 2:
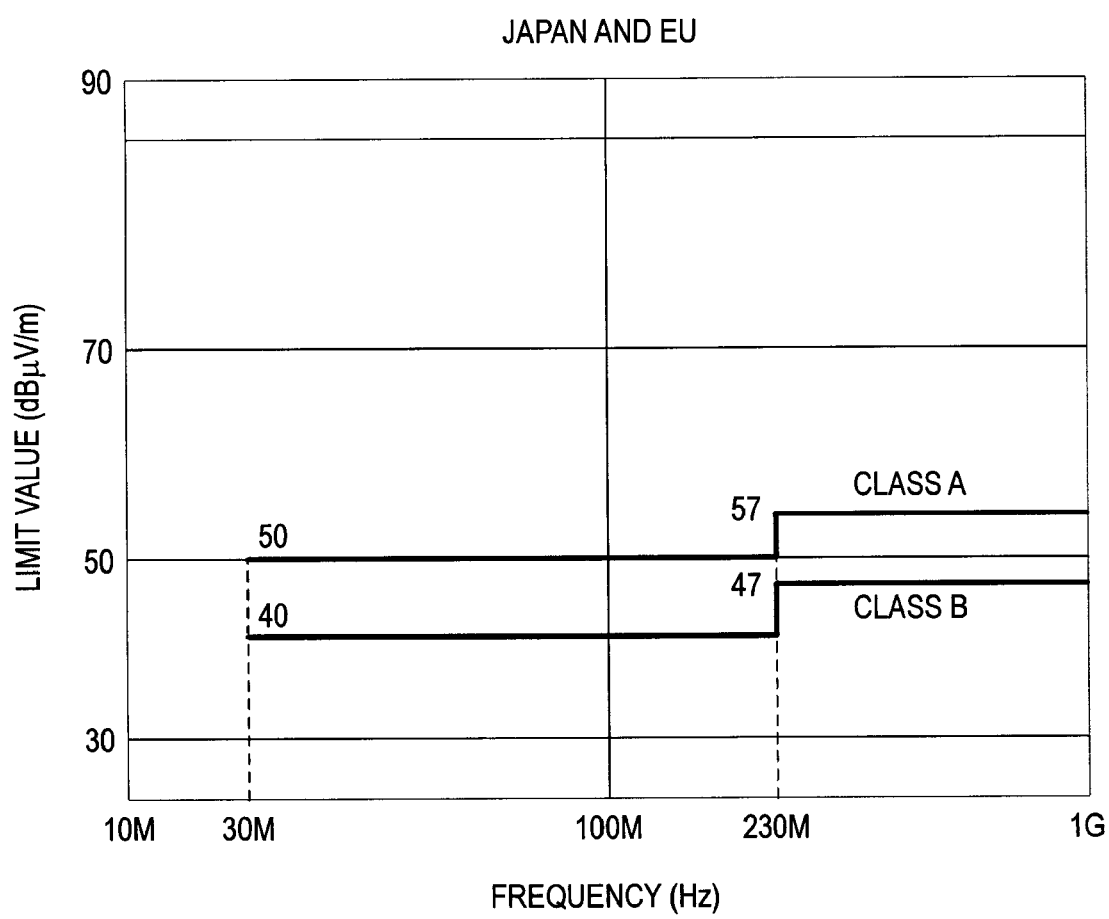
FIG. 2 shows a diagram depicting exemplary EMI standard values based on the VCCI standard and the EN standard.

In addition, FIG. 2 shows the EMI standard values in an industrial or a commercial area (Class A) and a residential area (Class B) based on the VCCI standard in Japan and the EN standard in Europe. In the case of the VCCI standard and the EN standard, today, frequency ranges of 30 MHz to 1 GHz are defined. It is predicted that the EMI standard values are defined to much wider frequency bands in future.

In the case of the embodiment, it is supposed that electronic appliances conform to an UWB (Ultra Wideband) wireless communication system. In the UWB wireless communication system, very weak transmission radio waves are outputted in a very wide frequency bandwidth of 3.1 GHz to 10.6 GHz. Thus, a high speed transmission of several hundreds of Mbps is made possible, and wireless communications can be performed in small power consumption.

The UWB wireless communication system corresponds to a WPAN (Wireless Personal Area Network) according to the classification of the Institute of Electrical and Electronics Engineers (IEEE).

In addition, the transmission distance of the WPAN is about 10 m. Moreover, the transmission rate of the WPAN is 1 m to 2 m and 480 Mbps (compliant to the report published by the Ministry of Public Management, Home Affairs, Posts and Telecommunications on Mar. 24, 2006). In the WPAN, it may be possible that a plurality of electronic appliances is connected to a single electronic appliance at the same time via wireless communications, and files are sent in a plurality of the electronic appliances at high speed.

For the UWB wireless communication standards, there are the "MB-OFDM system" using the frequency hopping system and "DS-UWB system" using the direct sequence spread spectrum system.

In the discussion below, the case of using the "MB-OFDM system" will be described.

Figure 3:
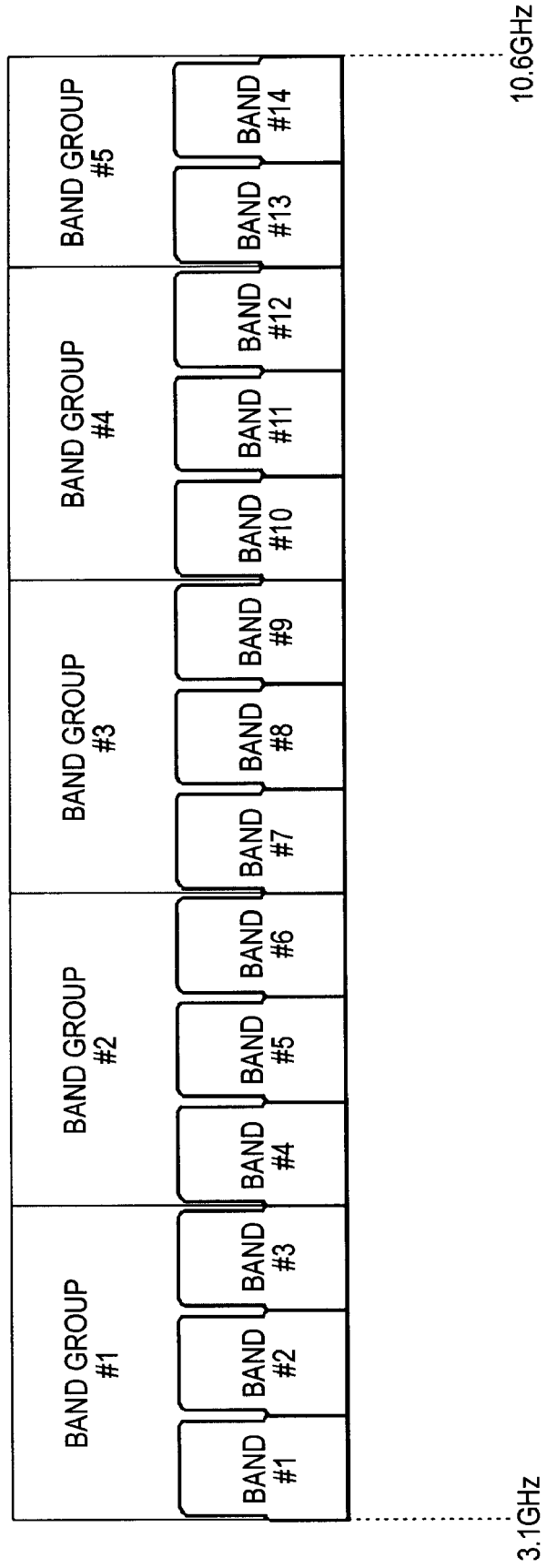
FIG. 3 shows a diagram depicting an exemplary band configuration used in the MB-OFDM system.

FIG. 3 shows a diagram illustrative of the "MB-OFDM system". In the "MB-OFDM system", a band of 528 MHz is allocated to a single band, whereby a band of 3.1 GHz to 10.6 GHz is split into 14 sub-bands in total. With the band splitting into the sub-bands, it is configured to implement stable wireless communications in which even though noise occurs in a certain sub-band, the sub-band is excluded from wireless communications.

In UWB wireless communications by electronic appliances, it is generally known that an EMI value higher than usual EMI values is exhibited in the frequency in which the phase of the waveform of the EMI pattern emitted from an electronic appliance is matched with the phase of the waveform of UWB radiation.

On this account, even though the electromagnetic interference (EMI) emitted from an electronic appliance is set below the limit value, such an event occurs that the EMI value unpredictably exceeds the EMI standard value. However, it is difficult to predict when and how the phase of the waveform of the EMI pattern emitted from an electronic appliance is matched with the phase of the waveform of UWB radiation. Therefore, it is really difficult to prevent the excess of the EMI standard value caused by phase synthesis.

Embodiment of a Communication Condition Setting Device

Configuration of the Apparatus

Figure 4:
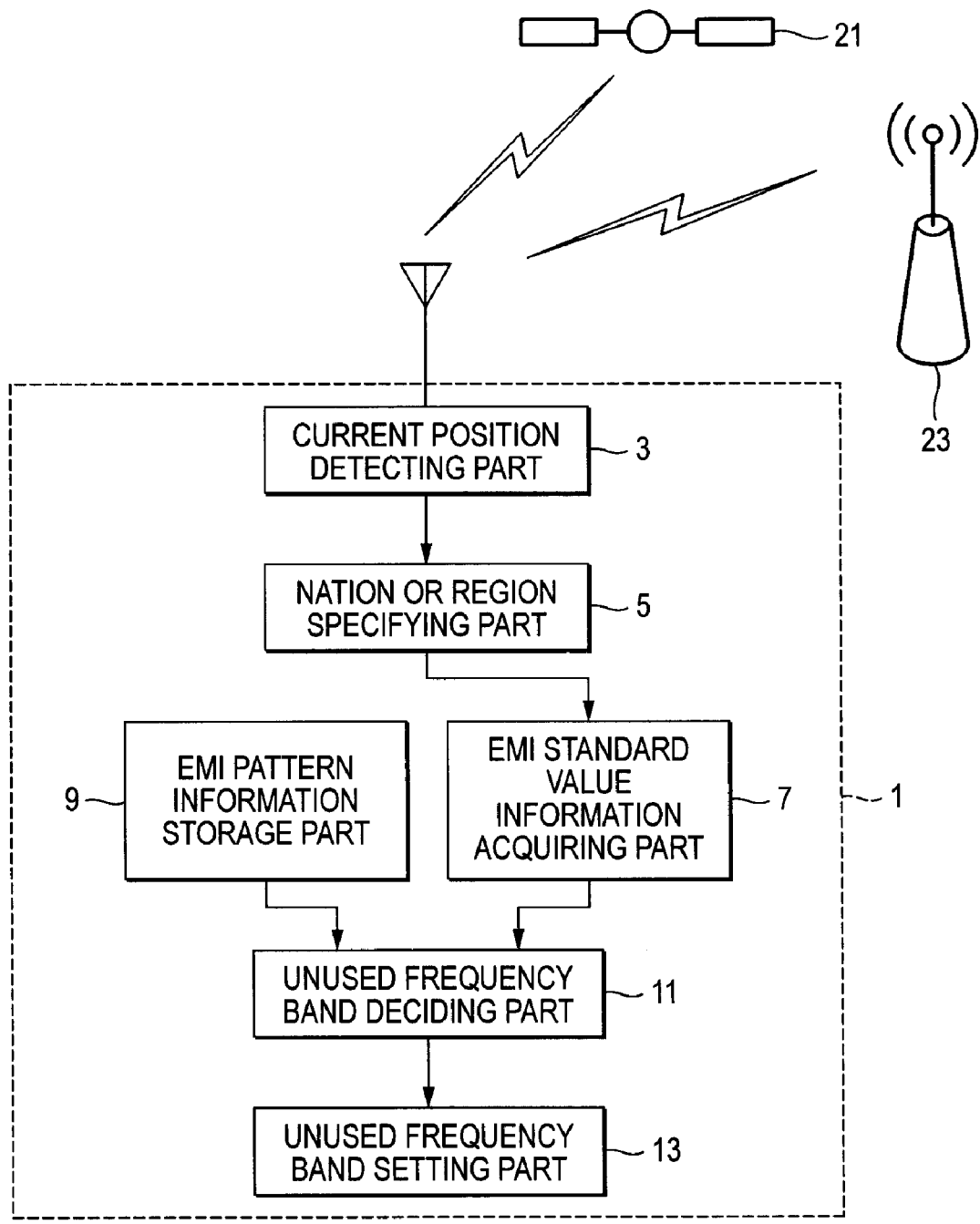
FIG. 4 shows a diagram depicting an exemplary configuration of an unused frequency band setting apparatus.

FIG. 4 shows the main configuration of an unused frequency band setting apparatus 1 which is preferable to be mounted on the electronic appliance described above. In addition, the unused frequency band setting apparatus 1 corresponds to a communication condition setting device according to an embodiment of the invention.

The unused frequency band setting apparatus 1 is configured of a current position detecting part 3, a nation or region specifying part 5, an EMI standard value information acquiring part 7, an EMI pattern information storage part 9, an unused frequency band deciding part 11 and an unused frequency band setting part 13.

The current position detecting part 3 is a device that detects the current position (location information) of an electronic appliance having the unused frequency band setting apparatus 1 mounted thereon. For example, the current position is detected by receiving radio waves transmitted from a GPS (Global Positioning System) satellite 21. In addition, for example, the current position is detected by receiving beacon signals transmitted from an access point 23 having a GPS receiver thereon.

Moreover, the current position detecting part 3 unnecessarily has a GPS receiver or a W-LAN communication machine incorporated therein, and it is sufficient that the current position detecting part 3 is externally connectable to a GPS receiver or a W-LAN communication machine. In addition, when position information necessary to identify the current position can be received, the current position detecting part 3 can be implemented by other configurations. For example, the current position detecting part 3 may receive position information through a mobile telephone system.

The nation or region specifying part 5 is a device that identifies a nation or a region in which an electronic appliance is located based on the detected position information. For example, for identifying the nation or region, country codes or area codes included in position information are used. Moreover, it may be possible that map information is checked to identify a nation or region. Here, it is unnecessary that the nation or region specifying part 5 stores map information (may store it), and it is sufficient that the nation or region specifying part 5 references to map information stored in an external unit.

The EMI standard value information acquiring part 7 is a device that references to a reference table stored in advance based on the identified current position information and identifies an EMI standard value defined to the relevant nation or region.

In the reference table, a plurality of sets of data that associates the EMI standard values to items of current position information is stored. The reference table corresponds to an "EMI standard value information storage part" according to an embodiment of the invention. In addition, the EMI standard value information acquiring part 7 also has a limit value readout part mounted thereon that reads a corresponding EMI standard value based on current position information. The limit value readout part corresponds to an "EMI standard value information readout part" according to an embodiment of the invention.

For example, the reference table here is stored in a non-volatile recording medium. In the case of corresponding to rewriting the reference table, a rewritable medium is used. The acquired EMI standard value is given to the unused frequency band deciding part 11 as EMI standard value information.

The EMI pattern information storage part 9 is a recording medium that stores an EMI pattern unique to the electronic appliance. In the case of the embodiment, the EMI pattern is defined on a frequency bandwidth of 3.1 GHz to 10.6 GHz. In addition, the EMI pattern of each frequency is given as the maximum value of the quasi-peak value appeared in various operation modes of the electronic appliance. The operation mode here includes all the operation modes that the electronic appliance can perform.

Moreover, for a simplified manner, it can be substituted in which the maximum value of the peak value corresponding to each of the operation modes of the electronic appliance is stored for the same frequency bandwidth. In addition, since the electronic appliance has almost the same EMI pattern characteristics between the same type of electronic appliances, the EMI pattern unique to the electronic appliance of the same type may be used, not the EMI pattern unique to the electronic appliance.

The EMI pattern here is also stored in a non-volatile recording medium. Moreover, in the case in which operation modes are added due to upgrade after used and consequently, the individual maximum values are likely to be changed, desirably, a rewritable recording medium is used.

The EMI pattern is given to the unused frequency band deciding part 11 as EMI pattern information.

The unused frequency band deciding part 11 compares the EMI pattern based on EMI pattern information and the EMI standard value based on EMI standard value information, detects a frequency having a smaller margin to the EMI standard value, and identifies a band including the relevant frequency. In the case of the embodiment, the unused frequency band deciding part 11 treats the identified band as a frequency band that is not used for UWB wireless communications.

Figure 5:
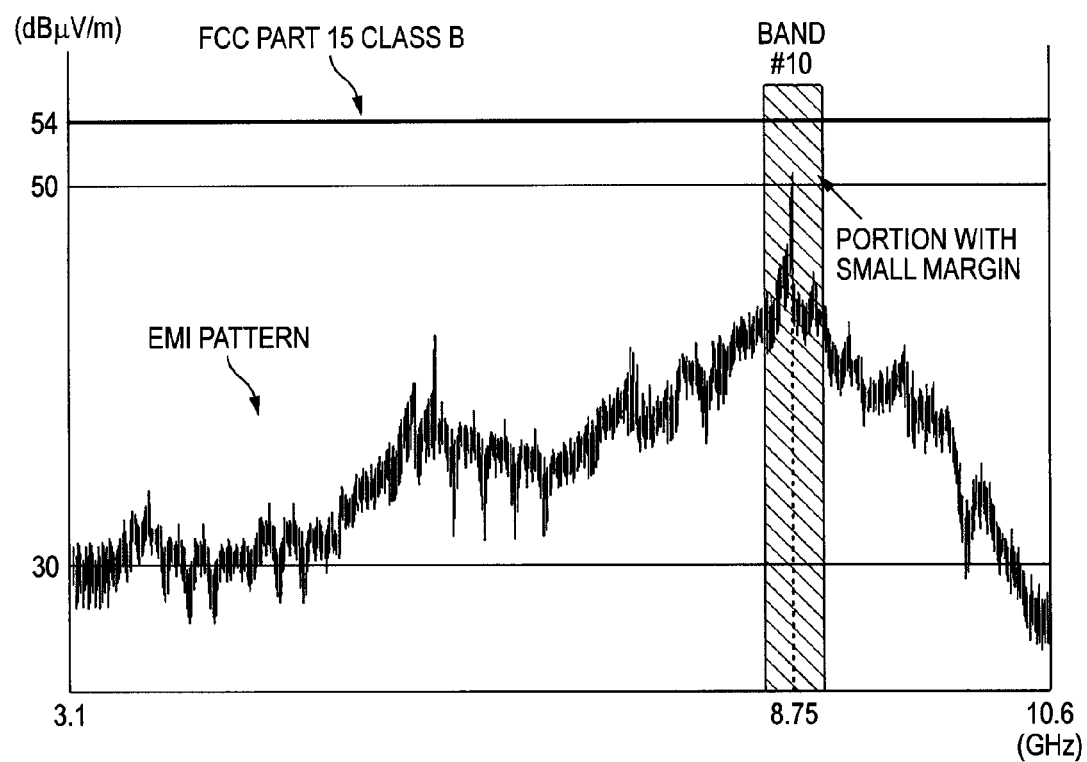
FIG. 5 shows a diagram depicting the relation between the EMI pattern and the EMI standard values in consideration of an interference with UWB wireless communications.

For example, FIG. 5 shows the EMI pattern overlaid with the EMI standard value (FCC: Part 15, Class B). In the frequency section indicated by an arrow (in the drawing, 8.75 GHz), a margin to the EMI standard value is small. In this case, the unused frequency band deciding part 11 treats a band including this frequency (in the drawing, it is band #10, and shaded) as an unused frequency band.

The unused frequency band identified by the unused frequency band deciding part 11 is given to the unused frequency band setting part 13.

The unused frequency band setting part 13 sets the given unused frequency band so as to be excluded from the frequency band that is used for UWB wireless communications.

For example, the unused frequency band setting part 13 uses a bandpass filter provided on an antenna circuit for UWB wireless communications, and excludes the unused frequency band from the use frequency band. Thus, UWB wireless communications using the unused frequency band can be reliably avoided. In other words, UWB wireless communications are conducted using frequency bands other than the unused frequency band.

At this time, a file that is scheduled to send using the unused frequency band is sent and received using other bands. In other words, the other bands complement communications conducted by the unused frequency band. As the result, the operation of wireless communications can be stably continued while the EMI standard value is reliably observed.

Advantage of the Embodiment

As discussed above, the adoption of the unused frequency band setting apparatus 1 can exclude such a band from the use band, the band in which the phase of the waveform of the EMI pattern of the electronic appliance is matched with the phase of the waveform of UWB radiation and thus the EMI value possibly exceeds the EMI standard value. Therefore, the electromagnetic interference (EMI) that occurs in the electronic appliance can be reliably suppressed equal to or below the EMI standard value.

In addition, in the circumstances in the today's world, it can be considered that people and things frequently cross regions and borders. At this time, electronic appliances can be also crossed and moved over regions and borders.

However, the adoption of the unused frequency band setting apparatus 1 can automatically change the EMI standard value, which is referenced when setting the unused frequency band, to the EMI standard value of the nation or region in which the electronic appliance exists.

In other words, even though a user forgets about switching the EMI standard value when crossing the border, the value can be automatically altered to satisfy the EMI standard value in which the user exists so as to avoid the electromagnetic interference (EMI) that occurs in the electronic appliance in UWB wireless communications.

Other Exemplary Settings of the Unused Frequency Band

In the discussion of the embodiment above, the case is described in which the UWB wireless communication condition setting process is completed in a single electronic appliance.

Here, the case will be described in which an EMI standard value acquired by a certain electronic appliance is given to other electronic appliances that can communicate with each other via a network, and the individual electronic appliances are automatically allowed to conduct a unique UWB wireless communication condition setting process.

Exemplary Setting in a Single Network

Figure 6:
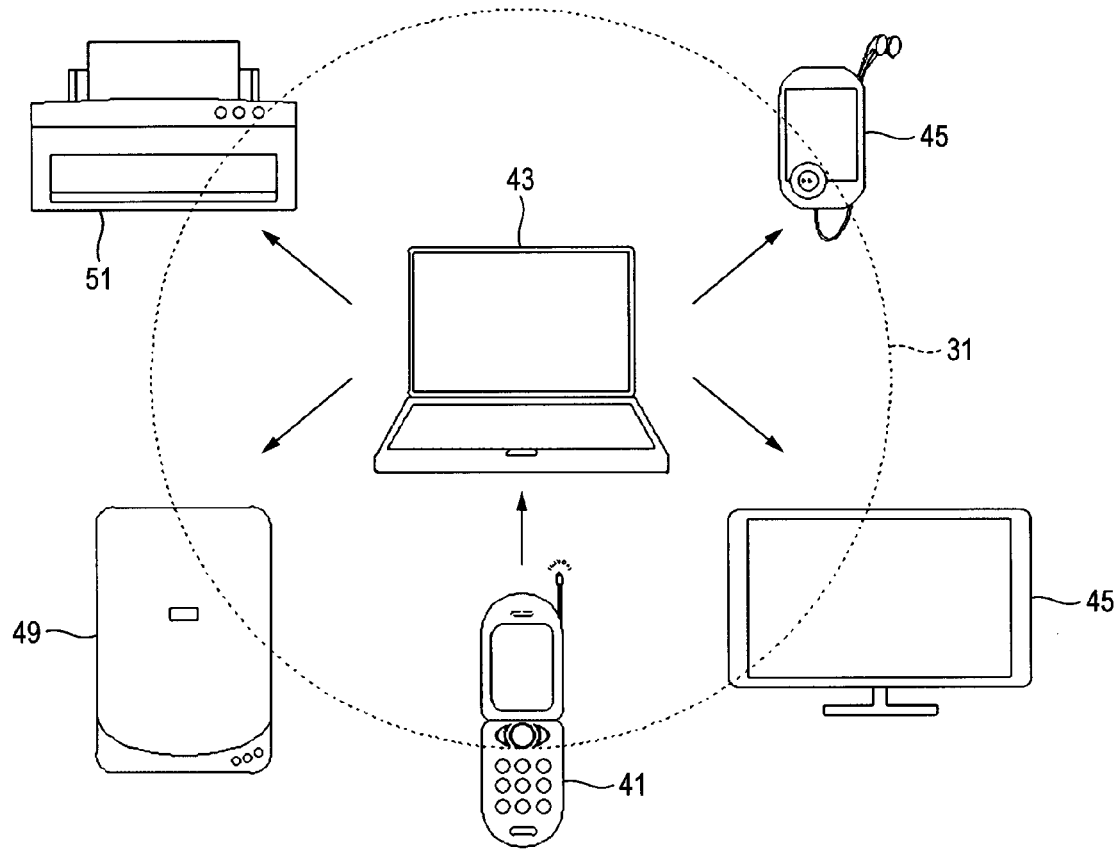
FIG. 6 shows a diagram illustrative of exemplary automatic settings of the UWB wireless communication condition.

FIG. 6 shows the case in which the automatic setting process of the UWB wireless communication condition is completely performed in a single network. In addition, in FIG. 6, suppose a network 31 is configured of a cellular telephone 41, a computer 43, a portable music player 45, a television set 47, a scanner 49 and a printer 51.

FIG. 6 shows the case in which the cellular telephone 41 has the unused frequency band setting apparatus 1 mounted thereon, and as the cellular telephone 41 is the start point, the automatic setting process of the UWB wireless communication condition is started.

In UWB wireless communication, a trigger operation is detected, and then wireless connection are established between a plurality of electronic appliances. For example, the trigger operation includes cable connection, and turning on a main power source. When the trigger operation is detected, the individual electronic appliances start negotiations, and confirm whether the destination electronic appliances whose existence is confirmed support a function of UWB wireless communications.

Through the negotiation process, various initial settings to start wireless communications are performed. After the initial settings are finished, the individual electronic appliances are turned into the state in which they can communicate with each other via wireless communications.

At this point in time, in the case in which such an electronic appliance still remains that emits radiation interference waves (EMI) exceeding the EMI standard value defined in the nation and the region in which that electronic appliance exists, that electronic appliance can start wireless communications in the illegal state.

Figure 7:
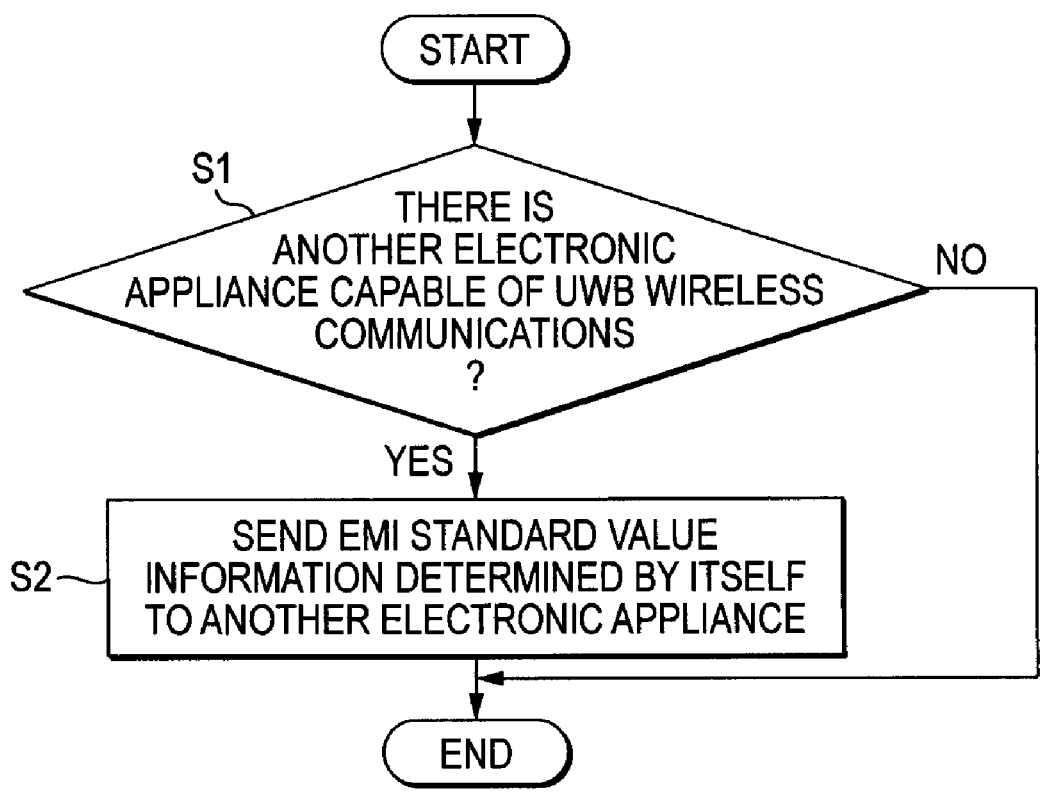
FIG. 7 shows a flow chart partially depicting an exemplary process program executed in an electronic appliance that performs the initial operation.

The processing operation shown in FIG. 7 is performed to eliminate this event. After the initial settings are finished, the cellular telephone 41 confirms whether the power sources of the other electronic appliances that can communicate with the cellular telephone 41 via wireless communications (the computer 43, the portable music player 45, the television set 47, the scanner 49 and the printer 51) are turned on while the cellular telephone 41 sets the unused frequency band relating to the cellular telephone 41.

In other words, the EMI standard value information acquiring part 7 determines whether there is another electronic appliance that can communicate via UWB wireless communications exist at the present point in time (S1). If the cellular telephone 41 (the EMI standard value information acquiring part 7) determines that there is another electronic appliance, it sends EMI standard value information acquired by it to the electronic appliances that are confirmed whose power source is turned on (S2).

FIG. 6 shows the network 31 formed of a wireless USB using the UWB wireless communication system in which the computer 43 has a host function and the cellular telephone 41 has a device function.

Therefore, in the case of FIG. 6, the cellular telephone 41 sends EMI standard value information only to the computer 43 having the host function.

The computer 43 uses the unused frequency band setting apparatus 1 mounted thereon, and sets the unused frequency band to the computer 43 and resends EMI standard value information to the other electronic appliances.

Of course, in the computer 43, the settings of the EMI standard value and the unused frequency band are completed in the initial settings. However, in the initial settings of a new electronic appliance (in this case, the cellular telephone 41), the settings of the EMI standard value and the unused frequency band are again performed.

Figure 8:
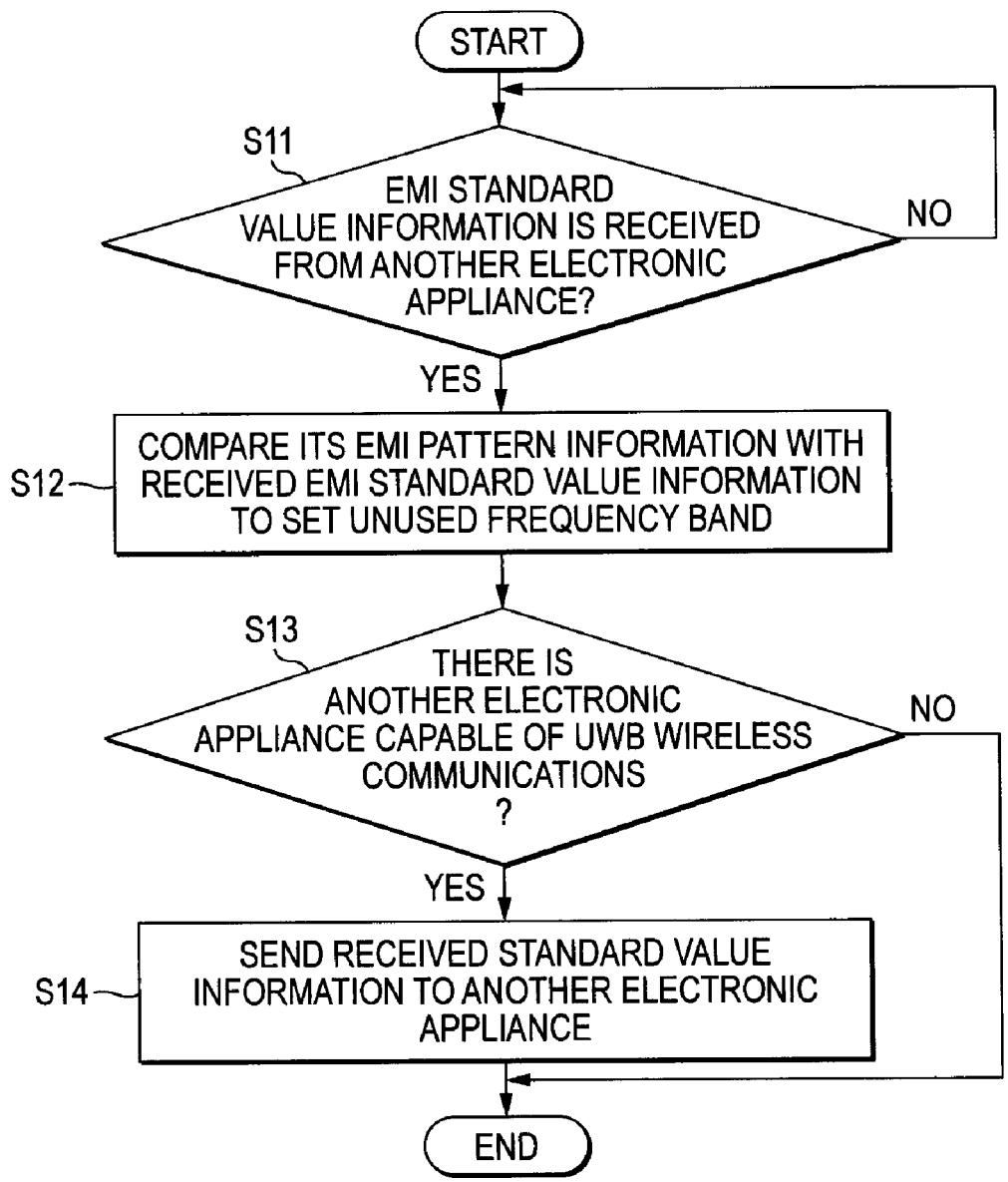
FIG. 8 shows a flow chart partially depicting an exemplary process program executed in an electronic appliance that is operated in response to receiving the notice of an EMI standard value from an electronic appliance that performs the initial operation.

FIG. 8 shows an exemplary processing operation that implements the processing function.

The EMI standard value information acquiring part 7 of the computer 43 always determines whether EMI standard value information is received from another electronic appliance (S11).

If the EMI standard value information acquiring part 7 determines that information is received, it compares the EMI pattern stored therein with the received EMI standard value, and sets the unused frequency band (S12).

After that, the EMI standard value information acquiring part 7 of the computer 43 determines whether there is another electronic appliance that can communicate via UWB wireless communications (S13). If the computer 43 (the EMI standard value information acquiring part 7) determines that there is another electronic appliance, it sends the EMI standard value information received by the computer 43 to the electronic appliances that are confirmed whose power source is turned on (S14).

In the case of FIG. 6, the computer 43 confirms that the power sources of the portable music player 45, the television set 47, the scanner 49 and the printer 51 are turned on, and then sends the EMI standard value information received by the computer 43 to these electronic appliances. Also in the other electronic appliances, the unused frequency band is set based on the received EMI standard value and their own EMI pattern.

This operation is repeatedly performed between the electronic appliances positioned on the network, whereby the unused frequency band of all the electronic appliances connected to the network can be automatically again set to the latest state.

This function is mounted, whereby even though the initial settings are made in an electronic appliance and then the electronic appliance is moved to the nation and the region different from those when initial settings are made in association with the migration of a person, the unused frequency band can be automatically set to all the electronic appliances positioned on the same network as the setting process is a trigger, the setting process of the unused frequency band to the electronic appliance for new initial settings (in the embodiment, the cellular telephone 41).

In addition, the EMI standard value used when the unused frequency band is automatically set is the EMI standard value mounted on the electronic appliance that is subjected to initial settings, not the EMI standard value stored in the individual electronic appliances. It is highly likely that the electronic appliance that is subjected to initial settings has the latest EMI standard value mounted thereon. Therefore, the unused frequency band can be set to even the electronic appliance that is not moved to cross the nation or the region after the initial settings are made so as to compliant to the latest EMI standard value.

Moreover, in the processing operation in which the electronic appliance that is subjected to new initial settings is a trigger, such a scheme is adopted that prevents the setting process of the unused frequency band from being continued in an overlapping manner without limit. For example, in the case in which the automatic setting process of the unused frequency band is performed at the same time, it is sufficient to mount such a function that an electronic appliance stops the setting process of the unused frequency band to that electronic appliance and also stops the transfer of the EMI standard value to the other electronic appliances.

In addition to these, in the case in which the EMI standard value is added with an ID symbol or a code indicating a new one or an old one, it may be determined whether the unused frequency band is set in an electronic appliance by itself or the EMI standard value is transferred to the other electronic appliances.

Figure 9:
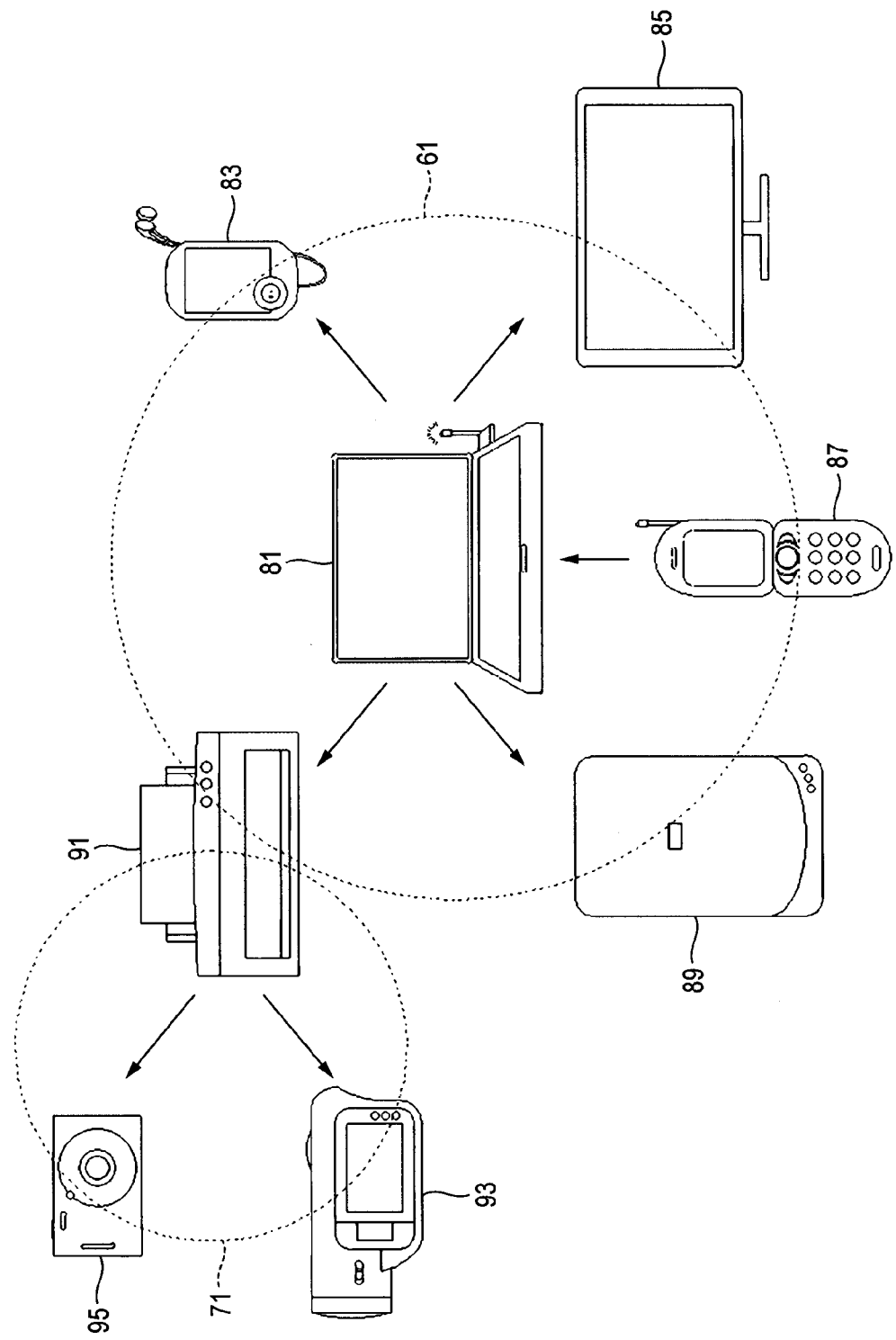
FIG. 9 shows a diagram illustrative of exemplary automatic settings of the UWB wireless communication condition.

Exemplary Setting in the Case in which there is an Electronic Appliance Belonging to a Plurality of Networks FIG. 9 shows the case in which the automatic setting process of the UWB wireless communication condition is performed over two networks. In addition, FIG. 9 shows the case in which two networks 61 and 71 are located at the same point.

The network 61 is configured of a computer 81, a portable music player 83, a television set 85, a cellular telephone 87, a scanner 89 and a printer 91. In addition, the network 71 is configured of the printer 91, a digital video camera 93 and a digital camera 95.

First, the processing operation performed in the network 61 will be described. In the case of FIG. 9, the computer 81 is the start point, and the automatic setting process of the UWB wireless communication condition is started. In other words, a trigger operation is detected to start negotiations, and an initial setting process is performed to communicate with the other electronic appliances via UWB wireless communications.

After the initial settings process is finished, the computer 81 confirms whether the power sources of the other electronic appliances that can communicate with the computer 81 via wireless communications (the portable music player 83, the television set 85, the cellular telephone 87, the scanner 89 and the printer 91) are turned on while the computer 81 sets the unused frequency band relating to the computer 81.

In the case of FIG. 9, the computer 81 sends EMI standard value information to all the electronic appliances positioned on the network 61 except the computer 81. As the result, in the individual electronic appliances, their own unused frequency band setting apparatuses 1 are used to set the unused frequency band to the individual electronic appliances and again send EMI standard value information to the other electronic appliances.

However, the printer 91, which can communicate with the network 71 via UWB wireless communications, transfers the received EMI standard value information to the other electronic appliances belonging to the network 71.

Figure 10:
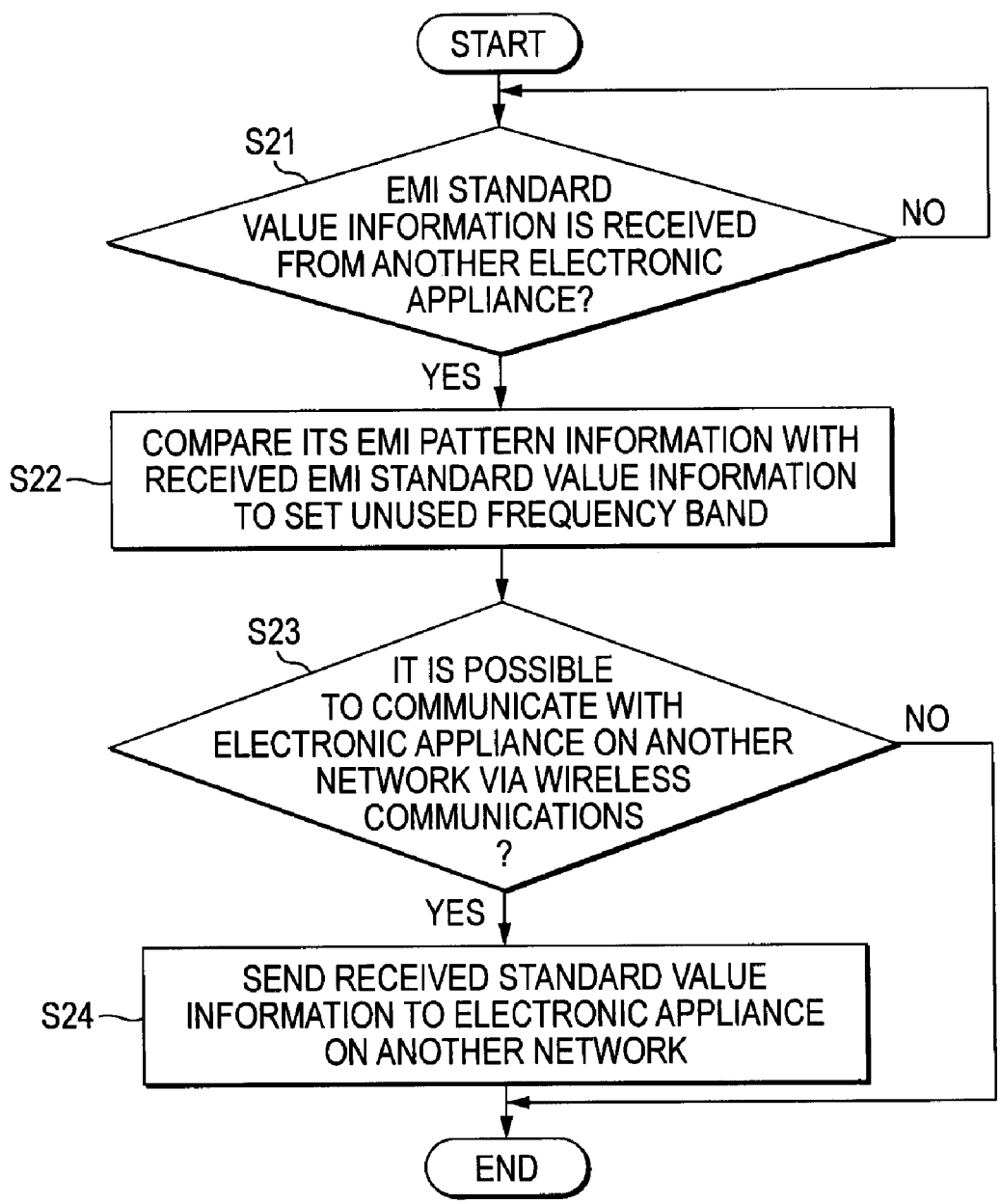
FIG. 10 shows a flow chart partially depicting an exemplary process program executed in an electronic appliance connected to two networks.

FIG. 10 shows an exemplary processing operation that implements the processing function.

The EMI standard value information acquiring part 7 of the printer 91 always determines whether EMI standard value information is received from another electronic appliance (S21).

If the EMI standard value information acquiring part 7 determines that information is received, it compares the EMI pattern stored in the EMI standard value information acquiring part 7 with the received EMI standard value to set the unused frequency band (S22).

After that, the EMI standard value information acquiring part 7 of the printer 91 determines whether there is another electronic appliance that can communicate via UWB wireless communications on the network 71 different from the received network 61 that has received the EMI standard value (S23). If the printer 91 (the EMI standard value information acquiring part 7) determines that there is another electronic appliance, it sends the EMI standard value information acquired by the printer 91 to the digital video camera 93 and the digital camera 95 that are confirmed whose the power sources are turned on (S24).

Of course, the digital video camera 93 and the digital camera 95 use the received EMI standard value to set the unused frequency band unique to the individual electronic appliances as well as transfer EMI standard value information to the other electronic appliances positioned on the same network.

These operations are repeatedly performed between the electronic appliances positioned on the two networks 61 and 71, whereby the unused frequency band of all the electronic appliances connected to two networks can be automatically again set to the latest state.

In addition, the function described above is mounted on all the electronic appliances, whereby the unused frequency band can be automatically again set across three or more of networks in a string of networks as long as there is an electronic appliance that belongs to two networks even though the number of networks is any number.

Figure 11:
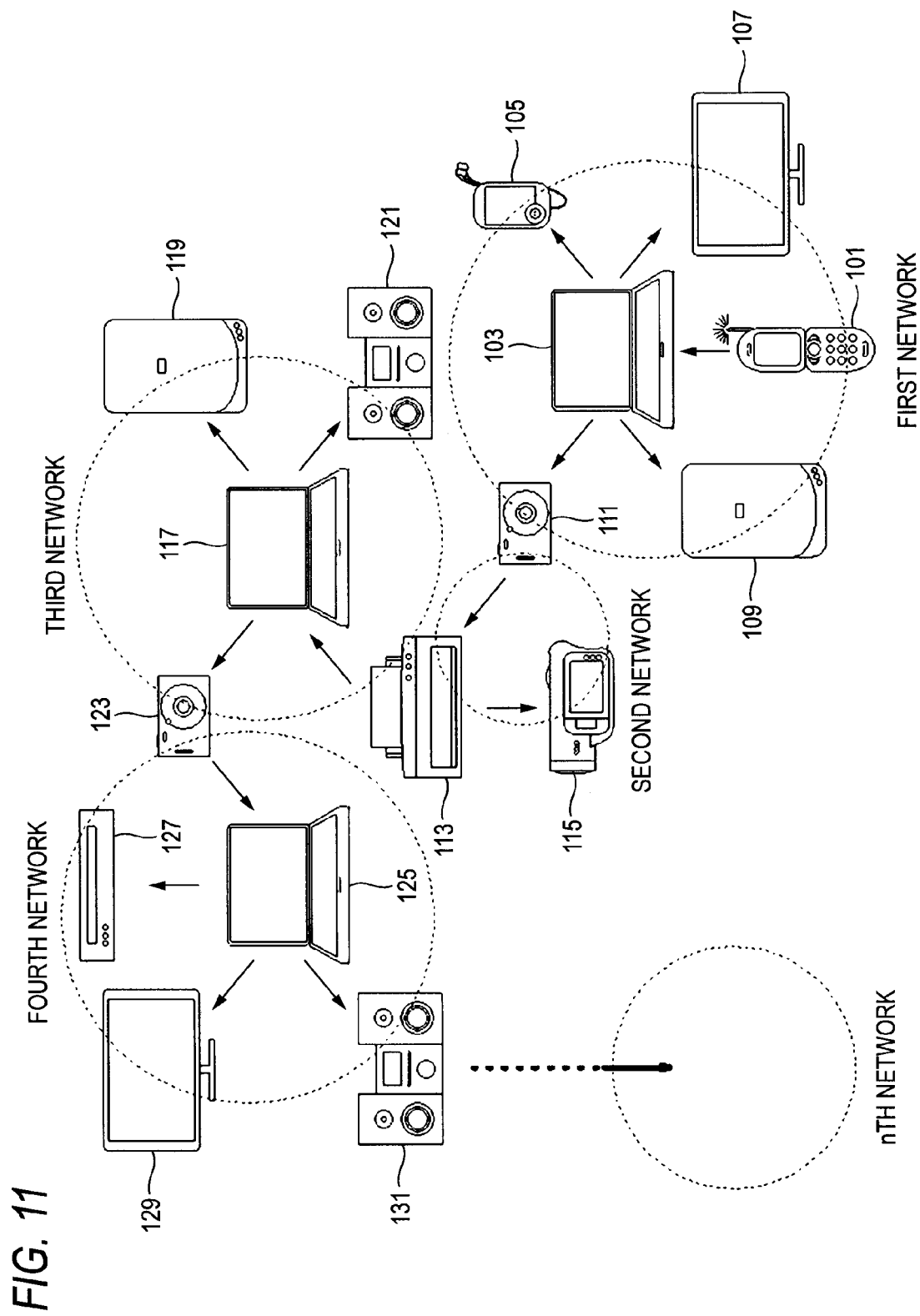
FIG. 11 shows a diagram illustrative of exemplary automatic settings of the UWB wireless communication condition.

FIG. 11 conceptually shows the manner in which the unused frequency band is automatically set to all the electronic appliances existing on n of networks through an electronic appliance that is connected to two networks as overlapped.

In the case of FIG. 11, a cellular telephone 101 connected to a first network sends EMI standard value information to a computer 103 to start automatically again setting the unused frequency band.

After that, the computer 103 sends EMI standard value information to a portable music player 105, a television set 107, a scanner 109 and a digital camera 111 connected to the same first network. Thus, the unused frequency band is automatically set to all the electronic appliances connected to the first network.

On the other hand, in a second network, EMI standard value information is notified to a printer 113 and a digital video camera 115 through the digital camera 111 connected to the first network as overlapped, and the unused frequency band is automatically set.

Similarly, in a third network, EMI standard value information is notified through the printer 113 connected to the second network as overlapped. In the case of FIG. 11, EMI standard value information is temporarily sent to a computer 117, and further notified to a scanner 119, a music player 121 and a digital camera 123. Thus, the unused frequency band is automatically set to all the electronic appliances connected to the third network.

Hereinafter, similarly, in a fourth the network, EMI standard value information is notified through the digital camera 123 connected to the third network as overlapped. In the case of FIG. 11, EMI standard value information is temporarily sent to a computer 125, and further notified to a DVD player 127, a television set 129 and a music player 131. Thus, the unused frequency band is automatically set to all the electronic appliances connected to the fourth network.

After that, the operation described above is repeated to an nth network.

The Other Embodiments

Another Exemplary Configuration 1 of the Communication Condition Setting Device

In the discussion above, the case is described in which a GPS receiver or a W-LAN communication machine is used to automatically detect the current position of the electronic appliance.

Figure 12:
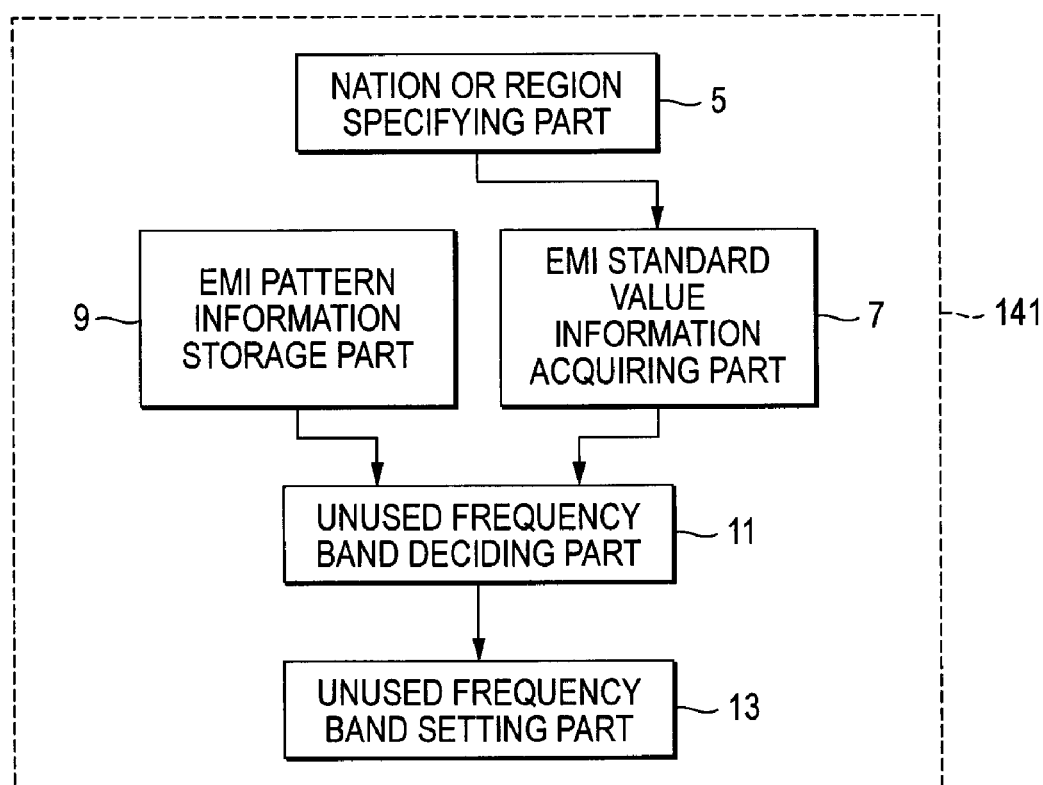
FIG. 12 shows a diagram depicting another exemplary configuration of an unused frequency band setting apparatus.

However, such a scheme may be adopted in which a user directly inputs a nation or region. FIG. 12 shows an exemplary configuration of an unused frequency band setting apparatus 141. In addition, in FIG. 12, the blocks corresponding to those shown in FIG. 4 are designated the same numerals and signs.

In the case of the unused frequency band setting apparatus 141, information about a nation or region in which an electronic appliance is currently positioned is manually inputted through user's switching manipulations. The operation after the nation or region is inputted is the same as the embodiment discussed above.

In the case of the embodiment, a user makes a proper setting manipulation on even a single electronic appliance, and thus the unused frequency band can be set automatically to a plurality of electronic appliances at the same time. In addition, this case is expected to exert an excellent advantage in the case in which no GPS receiver can be used.

Another Exemplary Configuration 2 of the Communication Condition Setting Device

In the embodiment discussed above, the case is described in which the frequency band having a smaller margin of the EMI pattern to the EMI standard value is set to the unused frequency band.

However, such a control scheme may be possible in which only the transmission electric power of the relevant frequency band is reduced so as to satisfy the EMI standard value in the relevant frequency band.

In this case, although it is likely to degrade communication quality in the relevant frequency band depending on the degree of drops of the transmission electric power, a reduction in the communication speed can be minimized because all the frequency bands can be used. In addition, such a scheme may be possible in which the transmission electric power in the entire band is reduced overall.

Moreover, it can be considered that the configuration is adapted to the communication conditions other than these.

Another Method of Acquiring the EMI Standard Value

In the embodiment discussed above, the case is described in which the EMI standard value mounted on an electronic appliance that newly starts initial settings is used between the individual electronic appliances.

However, such a scheme may be adopted in which the EMI standard value is downloaded from a server connected over a network in order to secure the latest EMI standard value. In this case, it is sufficient that the EMI standard value information acquiring part 7 has an EMI standard value information downloading part that acquires EMI standard value information through a network corresponding to location information of the electronic appliance itself, and an EMI standard value information storage part that stores the downloaded EMI standard value information.

In addition, such a scheme may be adopted in which a latest EMI standard value existing in a network is identified through negotiations between electronic appliances that can communicate with each other via wireless communications and the EMI standard value is shared between the electronic appliances.

Another Setting Method 1 of the Unused Frequency Band

In the embodiment discussed above, the method is described in which the EMI pattern unique to an electronic appliance is compared with the EMI standard value to decide the unused frequency band.

However, such a scheme may be adopted in which a band that possibly exceeds the EMI standard value is predicted based on the EMI pattern unique to the electronic appliance or the electronic appliance of the same type and this band is stored as the unused frequency band in advance in a recording medium. Of course, such a scheme may be possible in which information about the predicted band is used to control the transmission electric power in the same band or in the entire band.

Another Setting Method 2 of the Unused Frequency Band

In the embodiment discussed above, the case is described in which EMI standard value information is sent to the other electronic appliances to set the unused frequency band of the other electronic appliances.

However, information for transmission may be information about the current position detected by the current position detecting part 3 (current position information).

In addition, information for transmission may be information about the nation or region identified by the nation or region specifying part 5 (nation or region information).

In this case, it is sufficient that the other electronic appliances that have received current position information and nation or region information use these items of information to identify a nation or region in which the electronic appliances exist, and reference to the own reference table to identify the EMI standard value defined in that nation or region.

Wide Band Wireless Communication Systems

In the embodiment discussed above, the UWB wireless communication system is shown as an example of the wide band wireless communication system, but the embodiment can be adapted to all the wide band wireless communication systems in which it is predicted that interference is made with the EMI pattern to output waveforms that exceed the original EMI pattern.

Others

In the embodiment discussed above, various modifications can be considered within the scope of the teachings of the embodiment of the invention. In addition, the electronic appliance exemplified in the embodiment is one example, which can be also adapted to all the electronic appliances mounted with the wireless communication function (for example, household appliances such as air conditioners, refrigerators, and laundry machine). Moreover, various modifications and applications can be considered that are created or combined based on the descriptions of the specification.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic appliance having a communication function conforming to a wide band wireless communication system, comprising:
    an electromagnetic interference (EMI) pattern information storage part configured to store EMI pattern information unique to the electronic appliance itself or EMI pattern information unique to an electronic appliance of the same type;
    an EMI standard value information acquiring part configured to acquire EMI standard value information valid in a relevant nation or region based on location information of the electronic appliance itself; and
    a communication condition setting part configured to set a communication condition relating to a wide band wireless communication based on the result of comparison between the acquired EMI standard value information and the EMI pattern information.

2. The electronic appliance according to claim 1,
    wherein the EMI pattern is a maximum value of a quasi-peak value of an EMI level supposed in the electronic appliance itself or the electronic appliance of the same type.
3. The electronic appliance according to claim 1,
    wherein the EMI pattern is a maximum value of a peak value of an EMI level supposed in the electronic appliance itself or the electronic appliance of the same type.
4. The electronic appliance according to claim 1,
    wherein the communication condition setting part sets a frequency band that is not used in the wide band wireless communication.
5. The electronic appliance according to claim 4,
    wherein the communication condition setting part sets a frequency band having a small margin of the EMI pattern information to the EMI standard value information as an unused frequency band.
6. The electronic appliance according to claim 1,
    wherein the communication condition setting part sets a transmission electric power value that is used in wide band wireless communication.
7. The electronic appliance according to claim 1,
    wherein the EMI standard value information acquiring part comprises:
    an EMI standard value information storage part configured to store a plurality of items of EMI standard value information associated with individual nations or regions; and
    an EMI standard value information readout part configured to read EMI standard value information corresponding to the location information of the electronic appliance itself out of the EMI standard value information storage part.
8. The electronic appliance according to claim 1,
    wherein the EMI standard value information acquiring part comprises:
    an EMI standard value information downloading part configured to acquire EMI standard value information corresponding to the location information of the electronic appliance itself over a network; and
    an EMI standard value information storage part configured to store downloaded EMI standard value information.
9. The electronic appliance according to claim 1,
    wherein when the EMI standard value information is acquired, the EMI standard value information acquiring part sends the acquired EMI standard value information to another electronic appliance connected through wireless connection to one or a plurality of networks with which the electronic appliance itself can communicate.
10. The electronic appliance according to claim 1,
    wherein the EMI standard value information acquiring part acquires the location information of the electronic appliance itself through a GPS (Global Positioning System) or a WAN (Wide Area Network).
11. An electronic appliance having a communication function conforming to a wide band wireless communication system, comprising:
    an electromagnetic interference (EMI) pattern information storage part configured to store EMI pattern information unique to the electronic appliance itself or EMI pattern information unique to an electronic appliance of the same type; and
    a communication condition setting part configured to set a communication condition relating to a wide band wireless communication, when EMI standard value information or information identifying EMI standard value information is acquired from another electronic appliance on a network to which the electronic appliance itself is connected through wireless connection, based on the result of comparison between the acquired or identified EMI standard value information and the EMI pattern information.

12. The electronic appliance according to claim 11, wherein the electronic appliance is provided with a function by which, when there is at least one network to which the electronic appliance itself is connected through wireless connection other than the network from which the EMI standard value information or the information identifying EMI standard value information is acquired, the EMI standard value information or the information identifying EMI standard value information is transferred to the at least one network.

13. A communication condition setting device that sets a communication condition of an electronic appliance having a communication function conforming to a wide band wireless communication system, comprising:
　an EMI standard value information acquiring part configured to acquire EMI standard value information valid in a relevant nation or region based on location information of the apparatus itself; and
　a communication condition setting part configured to set a communication condition relating to a wide band wireless communication based on the result of comparison between the acquired electromagnetic interference (EMI) standard value information and EMI pattern information unique to an electronic appliance having the device mounted thereon or EMI pattern information unique to an electronic appliance of the same type.

14. A method of setting a communication condition of a wide band wireless communication system to which an electronic appliance conforms, the method comprising the steps of:
　acquiring electromagnetic (EMI) standard value information valid in a relevant nation or region based on location information of the electronic appliance;
　reading EMI pattern information unique to an electronic appliance itself or EMI pattern information unique to an electronic appliance of the same type out of a storage part; and
　setting a communication condition relating to a wide band wireless communication based on the result of comparison between the acquired EMI standard value information and the EMI pattern information.

15. A method of setting a communication condition of a wide band wireless communication system to which an electronic appliance conforms, the method comprising the steps of:
　determining whether electromagnetic interference (EMI) standard value information or information identifying EMI standard value information is acquired from another electronic appliance on a network to which the electronic appliance itself is connected through wireless connection;
　reading EMI pattern information unique to the electronic appliance itself or EMI pattern information unique to an electronic appliance of the same type out of a storage part when the EMI standard value information or the information identifying EMI standard value information is acquired from the another electronic appliance; and
　setting a communication condition relating to a wide band wireless communication based on the result of comparison between the acquired or identified EMI standard value information and the EMI pattern information.

16. A computer including a processor and a memory running a program to set a communication condition of a wide band wireless communication system to which an electronic appliance conforms, the program performing the steps of:
　acquiring electromagnetic interference (EMI) standard value information valid in a relevant nation or region based on location information of the electronic appliance itself;
　reading EMI pattern information unique to the electronic appliance itself or EMI pattern information unique to an electronic appliance of the same type out of a storage part; and
　setting a communication condition relating to a wide band wireless communication based on the result of comparison between the acquired EMI standard value information and the EMI pattern information.

17. A computer including a processor and a memory running a program to set a communication condition of a wide band wireless communication system to which an electronic appliance conforms, the program performing the steps of:
　determining whether electromagnetic interference (EMI) standard value information or information identifying EMI standard value information is acquired from another electronic appliance on a network to which the electronic appliance itself is connected through wireless connection;
　reading EMI pattern information unique to the electronic appliance itself or EMI pattern information unique to an electronic appliance of the same type out of a storage part when the EMI standard value information or the information identifying EMI standard value information is acquired from the another electronic appliances; and
　setting a communication condition relating to a wide band wireless communication based on the result of comparison between the acquired or identified EMI standard value information and the EMI pattern information.

* * * * *